United States Patent
Ursell et al.

(10) Patent No.: US 6,988,719 B2
(45) Date of Patent: Jan. 24, 2006

(54) ROLLERSTAND

(75) Inventors: Michael Ursell, Beverly Hills, MI (US); Timothy Hewitt, Pleasant Ridge, MI (US)

(73) Assignee: HTC Products, Inc., Royal Oak, MI (US)

(*) Notice: Subject to any disclaimer, the term of this patent is extended or adjusted under 35 U.S.C. 154(b) by 0 days.

(21) Appl. No.: 10/454,314

(22) Filed: Jun. 4, 2003

(65) Prior Publication Data

US 2003/0230839 A1 Dec. 18, 2003

Related U.S. Application Data

(60) Provisional application No. 60/385,810, filed on Jun. 4, 2002.

(51) Int. Cl.
  *B23Q 3/00* (2006.01)
  *B23Q 1/00* (2006.01)
  *B23Q 3/18* (2006.01)
  *A47H 1/10* (2006.01)
  *F16M 13/00* (2006.01)

(52) U.S. Cl. .............. 269/289 MR; 269/47; 269/52; 269/60; 269/61; 269/282; 269/289 R; 248/269; 248/430

(58) Field of Classification Search ............. 269/47, 269/52, 60, 61, 282, 289 MR, 289 R; 254/102, 254/103; 248/269, 430

See application file for complete search history.

(56) References Cited

U.S. PATENT DOCUMENTS

| | | | |
|---|---|---|---|
| 2,705,119 A | 3/1955 | Ingwer | |
| 2,733,330 A * | 1/1956 | Blewett | 219/158 |
| 2,893,669 A | 7/1959 | Kindorf | |
| 3,637,179 A * | 1/1972 | Marschak | 248/188.7 |
| 3,741,509 A | 6/1973 | Kelly | |
| 4,335,523 A * | 6/1982 | Bryant | 33/371 |
| 4,492,354 A | 1/1985 | Rice | |
| 4,520,981 A * | 6/1985 | Harrigan | 248/413 |
| 4,699,343 A | 10/1987 | Handler et al. | |
| 5,028,149 A | 7/1991 | Hardtke | |
| 5,060,907 A * | 10/1991 | Castano | 248/514 |
| 5,247,976 A | 9/1993 | Matthews | |
| 5,299,656 A * | 4/1994 | Grill | 182/186.4 |
| 5,337,875 A * | 8/1994 | Lee | 193/35 R |
| 5,435,411 A * | 7/1995 | Borgatti | 182/181.1 |
| 6,179,024 B1 * | 1/2001 | Yang | 144/287 |

FOREIGN PATENT DOCUMENTS

FR 0018495 A1 * 8/2003

* cited by examiner

*Primary Examiner*—Joseph J. Hail, III
*Assistant Examiner*—Bryan Muller
(74) *Attorney, Agent, or Firm*—Howard & Howard

(57) ABSTRACT

A stand for movably supporting a workpiece is disclosed. The stand includes a base, a support and a plurality of roller assemblies. The support is releasably connected to the base for permitting the height of the stand to be altered. The roller assemblies are mounted on diverging surfaces which are in turn mounted at oblique angles relative to the support for permitting non-interfering movement of the workpiece relative thereto. Each roller assembly includes a sphere captured within a collar mounted on a selected one of the diverging surfaces for permitting free-rolling movement of the sphere relative to the collar and the workpiece.

14 Claims, 5 Drawing Sheets

US 6,988,719 B2

ROLLERSTAND

RELATED APPLICATIONS

This application claims priority to provisional patent application 60/385,810 which was filed Jun. 4, 2002.

BACKGROUND OF THE INVENTION

1. Field of the Invention

The subject invention relates to an adjustable stand of the type used to receive and support a workpiece thereon and permit movement of the workpiece relative thereto.

2. Description of the Related Art

Various support stands are well known in the art. Such stands include a base, and a platform or other support member mounted on the base for a workpiece to be positioned thereon. An example of such a stand is disclosed in U.S. Pat. No. 3,741,509 ("the Kelly Patent").

The Kelly Patent discloses a pipe jack assembly having an elongate base. A retractable tripod is attached to the base. A length of tubing is telescopically received within the base and has an upper end upon which a V-shaped member is mounted. A roller is positioned on each of two axially-extending rods, which are in turn mounted on the V-shaped member so that the longitudinal axis of each rod extends parallel to the major longitudinal axis of the V-shaped member. Mounting the rods on the V-shaped surfaces in this manner permits an elongate cylindrical pipe to be received on the rollers and circumrotated about its own major longitudinal axis. However, movement of the pipe or other workpiece is limited because each roller is only capable of circumrotating about the rod upon which the roller is mounted. Other references disclose supports with rollers mounted on a single axis. A pipe or other elongate workpiece engaging such rollers may only be moved in directions parallel to the longitudinal axis of the pipe or workpiece and perpendicular to the axis upon which the roller is mounted.

Although the related art discloses inventions which allow a cylindrical workpiece to be circumrotated about its longitudinal axis or translated in a direction parallel thereto, such inventions permit nothing more than bi-directional movement of a workpiece relative to the axis upon which the roller is mounted, or alternatively limit movement of the workpiece within a single plane by mounting the one or more rollers on a flat surface. Thus, there remains an opportunity for a stand to be provided that features a support upon which one or more roller assemblies are mounted upon which a workpiece having either a planar or curved surface may be moved in multiple directions relative to the roller assemblies.

BRIEF SUMMARY OF THE INVENTION AND ADVANTAGES

The invention provides a stand for movably supporting a workpiece thereon. The stand has a base for supporting the stand on a surface. A support is carried by the base. A plurality of roller assemblies are mounted on the support. The support includes first and second diverging surfaces upon which the roller assemblies are mounted. Each the roller assemblies defines an infinite surface relative to the workpiece for receiving the workpiece thereon and permitting omnidirectional movement of the workpiece relative thereto.

Accordingly, the subject invention overcomes the limitations of the related art by providing a support stand that enables unimpeded movement of any workpiece positioned thereon regardless of whether the workpiece has a curved or planar surface. This is achieved by mounting roller assemblies on diverging surfaces. The roller assemblies utilized in the subject invention define infinite surfaces relative to the workpiece upon which the workpiece may translate, pivot, or otherwise move in multiple directions.

BRIEF DESCRIPTION OF THE SEVERAL VIEWS OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
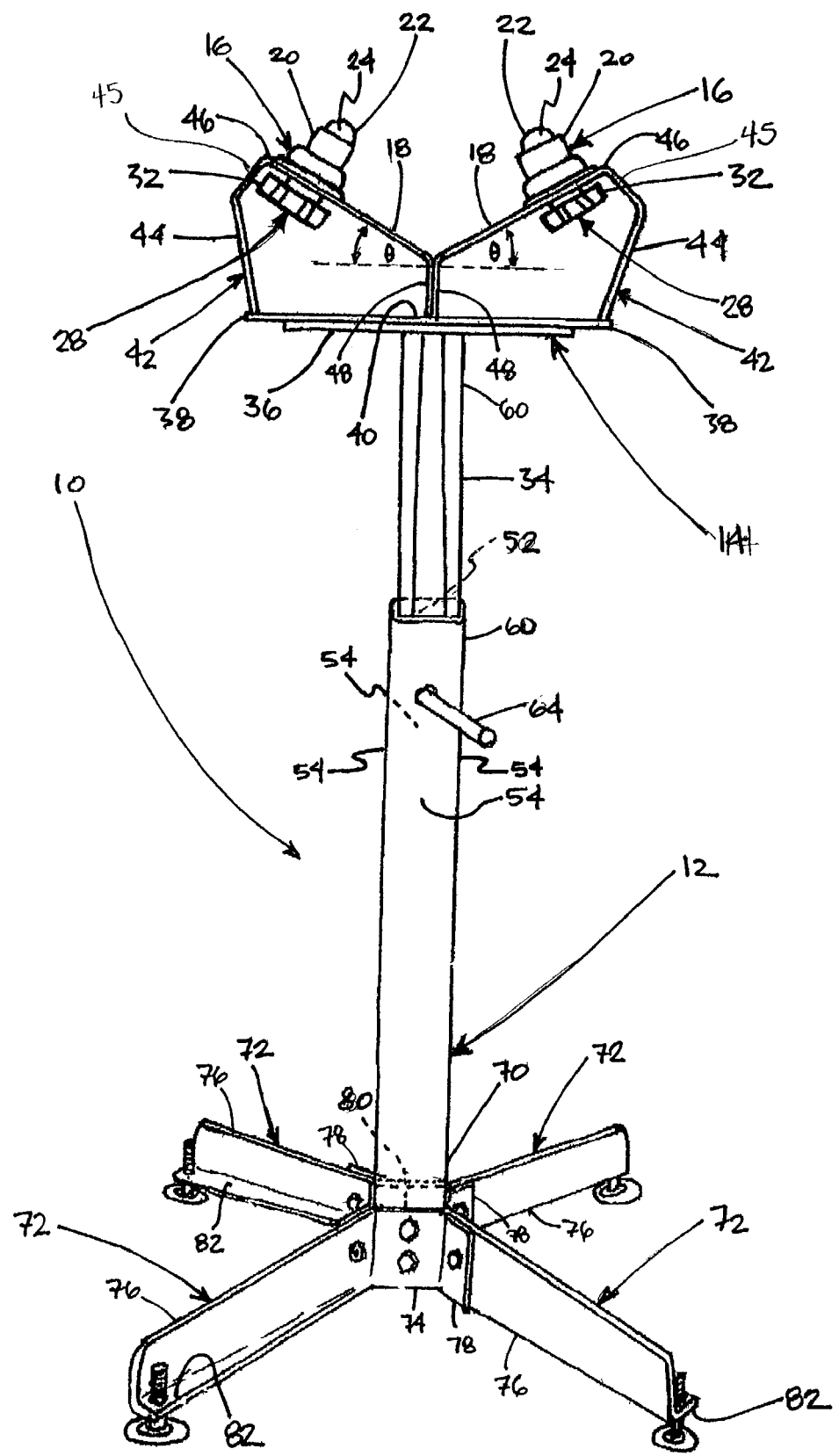
FIG. 1 is a perspective view of a stand in an extended position in accordance with the subject invention.
Figure 2:
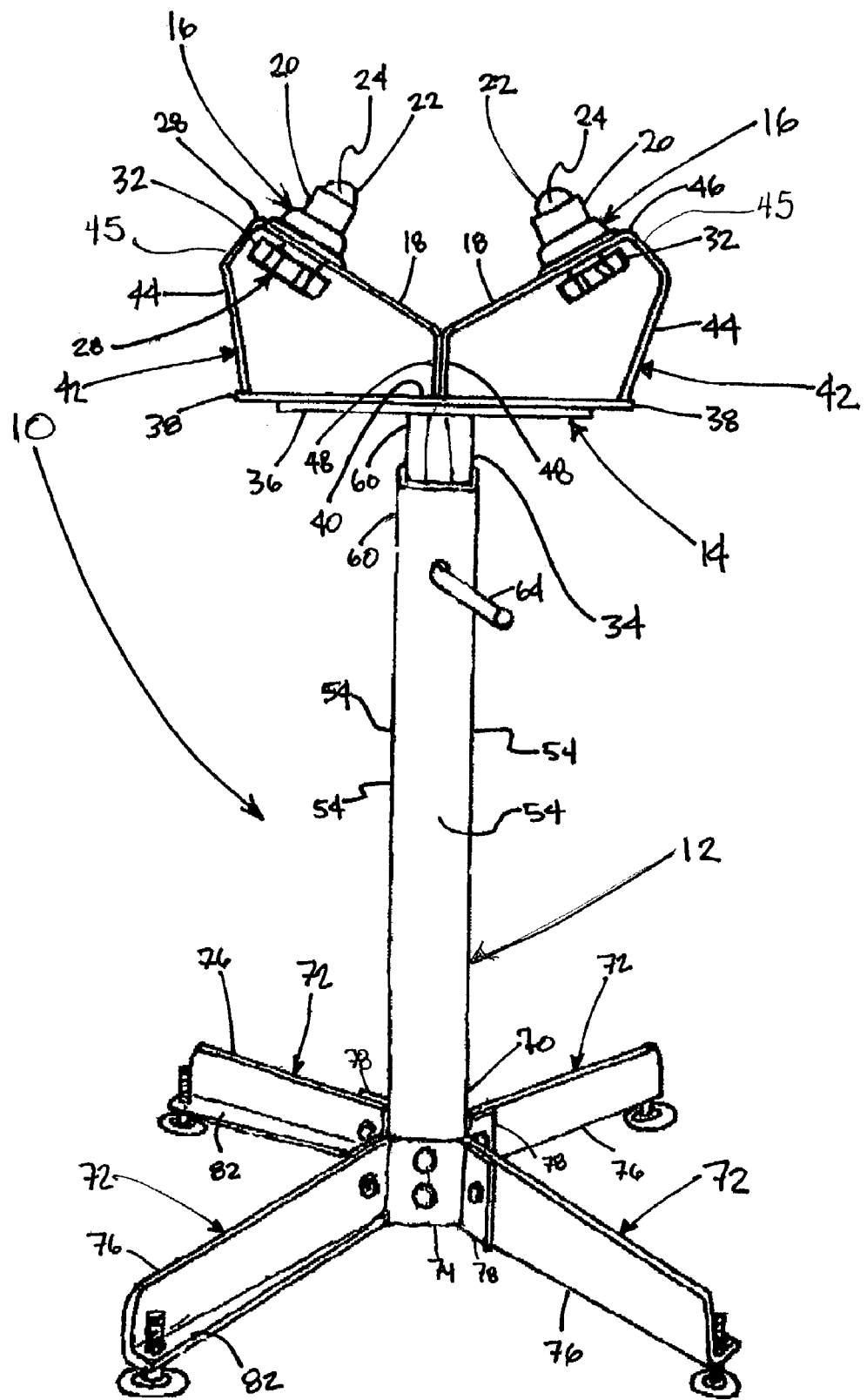
FIG. 2 is a perspective view of a rollerstand according to FIG. 1 and placed in a retracted position.
Figure 3:
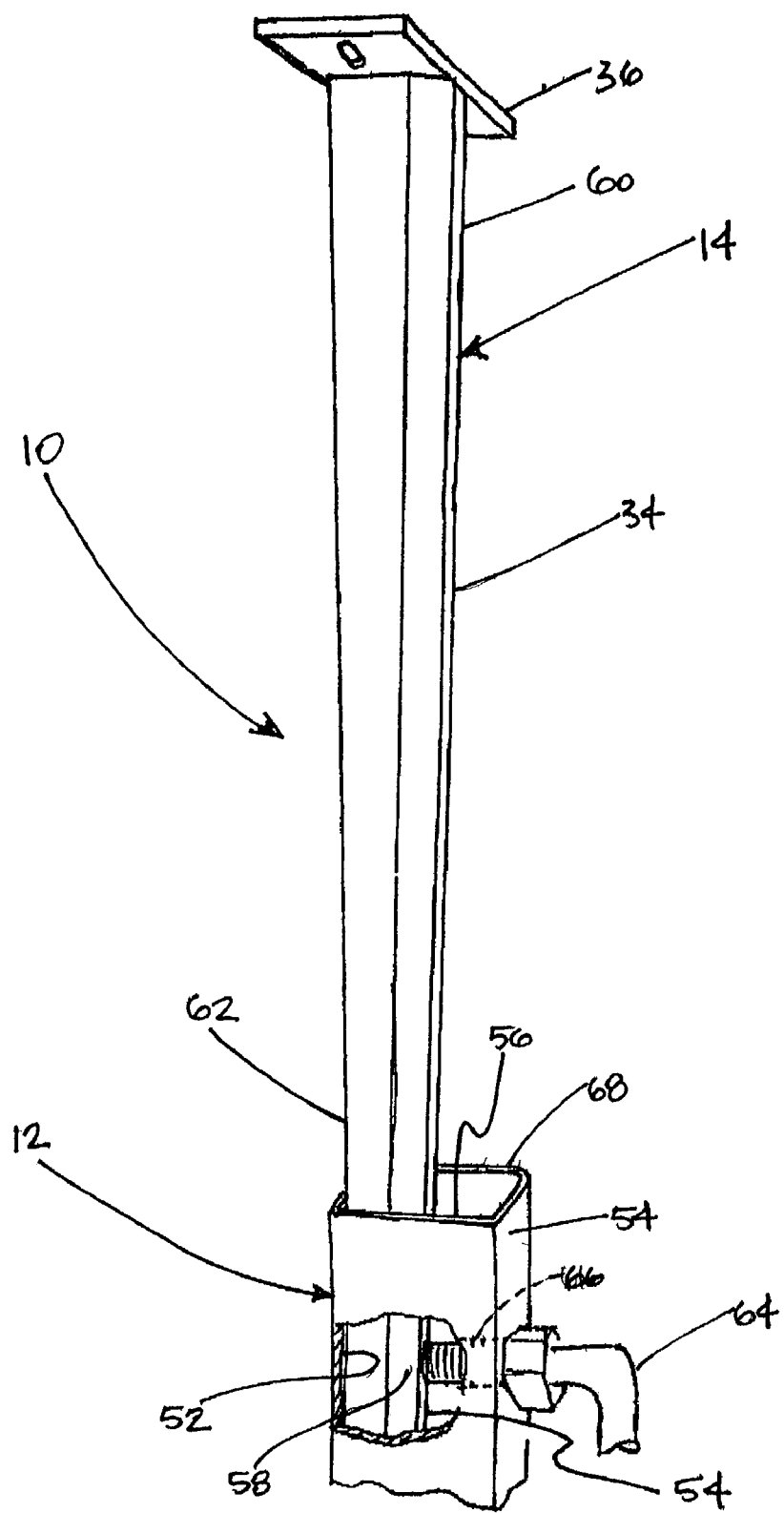
FIG. 3 is a partial, cut-away perspective view of the base and support of a stand according to FIG. 1.
Figure 4:
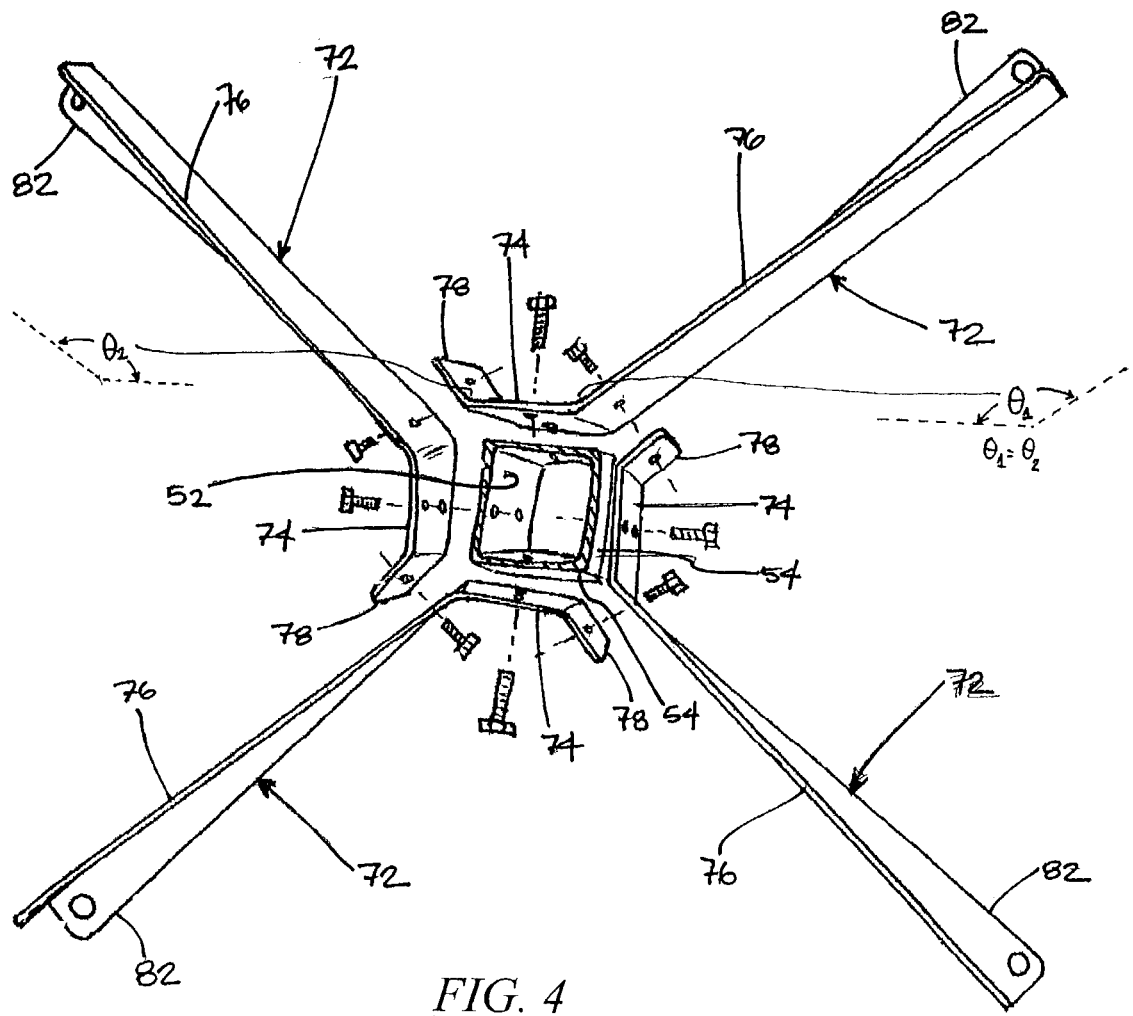
FIG. 4 is an exploded perspective view of the leg assembly of a stand according to FIG. 1 prior to the leg assembly being assembled on the base.
Figure 5:
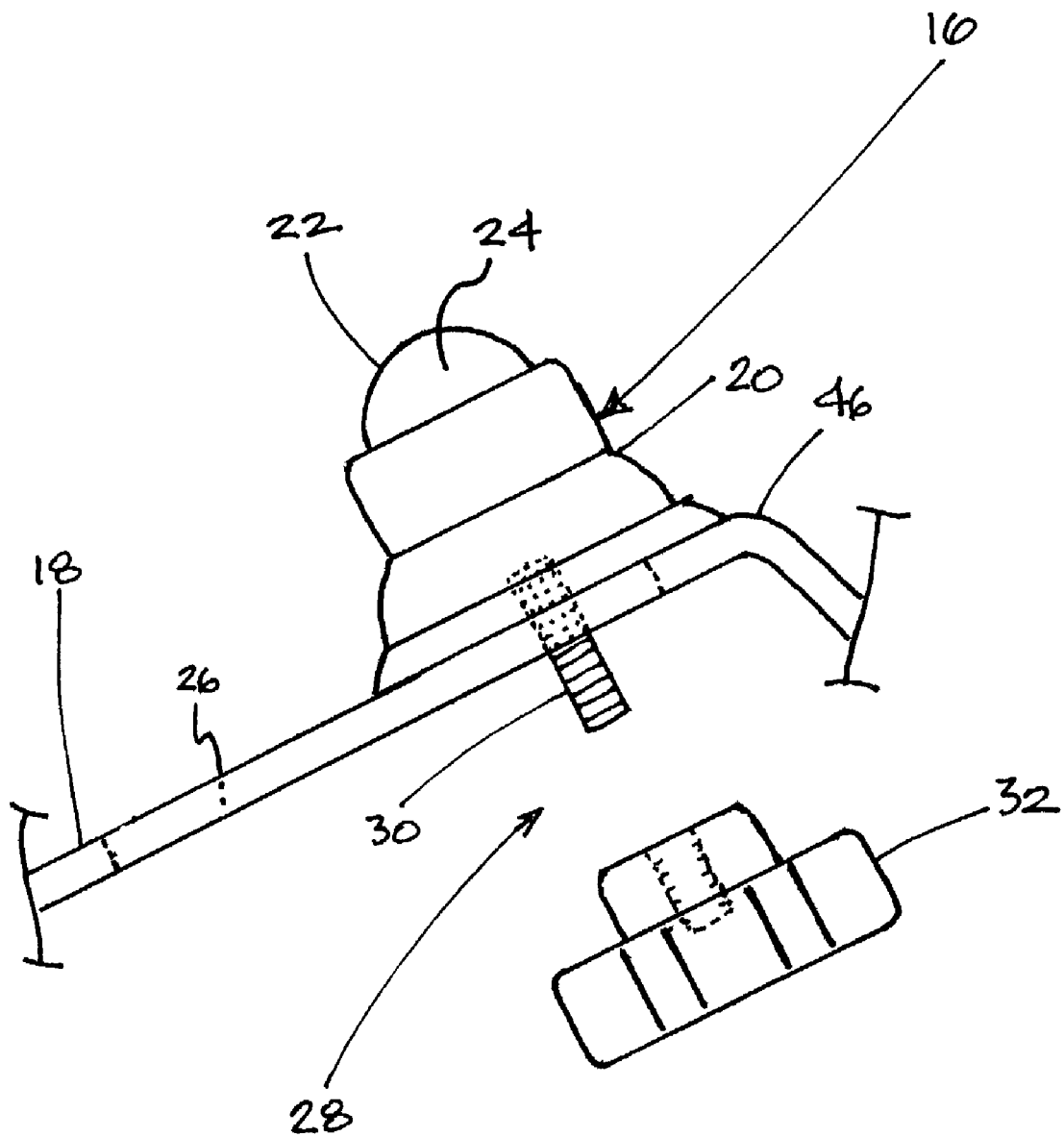
FIG. 5 is an exploded perspective view of one of the adjustment devices of a stand according to FIG. 1.

Referring to the Figures, wherein like numerals indicate like or corresponding parts throughout the several views, a stand is shown generally at 10 in FIG. 1. The stand 10 receives a workpiece thereon, and includes a base 12, a support 14 and a plurality of roller assemblies 16. The support 14 includes first and second diverging surfaces 18 upon which the roller assemblies 16 are mounted. A collar 20 is mounted on each of the diverging surfaces 18. Each of the roller assemblies 16 includes a sphere 22 captured within the collar 20, which permits free-rolling movement of the sphere 22 relative to the collar 20. In essence, the free-rolling sphere 22 defines an infinite surface 24 relative to the workpiece. The infinite surface 24 receives the workpiece thereon and permits omnidirectional movement of the workpiece relative thereto.

The support 14 is specifically configured for adjusting the roller assemblies 16 up and down the diverging surfaces 18. In particular, each diverging surface includes a slot 26. A roller assembly 16 is adjustably mounted in each slot 26 using an adjustment device 28. Each adjustment device 28 includes a threaded shaft 30. The shaft 30 extends downwardly from one of the collars 20 and through the slot 26 associated therewith. A knob 32 threadably engages the threaded shaft 30 for frictionally tightening the collar 20 against the diverging surface 20.

The support 14 also includes an elongate member 34. The elongate member 34 is in telescoping relationship with the base 12 and a platform 36. The platform 36 has peripheral edges 38 and a central portion 40. The first and second diverging surfaces 18 are each defined by a strap 42. Each strap 42 has a major leg 44 that extends upwardly and outwardly from the outer peripheral edge 38 of the platform 36 through an intermediately inwardly inclined section 45, to a high end 46 of the diverging surface 18. Each strap 42 also has a minor leg 48 that extends upwardly and perpendicularly from the central portion 40 of the platform 36 to a low end 50 of the diverging surface 18.

Orienting the major and minor legs 44 and 48 in the aforementioned manner positions each diverging surface 18 at an oblique angle "θ" relative to the platform 36. This permits the workpiece to move in any direction relative to the infinite surfaces 24 defined by the spheres 22 without interfering with the collars 20 or diverging faces 18. The oblique angle "θ" at which each diverging face 18 rises above the platform 26 is in the range of 15° and 35°; however a preferred oblique angle "θ" is 30°.

The support 14 is releasably connected to the base 12. Specifically, The base 12 is tubular, and has interior and exterior sidewalls, 52 and 54, respectively, that define a chamber 56 therein. The elongate member 34 is telescopically disposed in the tubular base 12. The elongate member 34 has a tapered portion 58 tapering inwardly from an upper portion 60 to a lower portion 62.

A locking pin 64 extends through the base 12 and engages the tapered portion 58, thereby preventing downward movement of the elongate member 34 relative to the base 12. The base 12 includes a hole 66 that extends through the interior and exterior sidewalls 52 and 54. The locking pin 64 is disposed in the hole 66 and engages the tapered portion 58 of the elongate member 34, thereby releasably locking the lower portion 62 against the inner sidewall 52 of the base 12 and placing the support 14 in the selected one of the vertical positions.

The shape of the tapered portion 58 allows a lower torque to be applied to the locking pin 64 to decrease the height of the stand 10 than that which would typically be required to decrease the height of a stand having an elongate member with a lower end including a bearing surface extending perpendicularly to the longitudinal axis of the bolt 52, rather than having a lower end with a tapered shape like that of the lower end 48.

The base 12 also has upper and lower ends, 68 and 70, respectively, and includes a plurality of legs 72. The legs 72 extend radially from the lower end 70. Each leg 72 includes a web 74 that extends generally parallel to the longitudinal axis of the base 12 and a rail 76 that extends outwardly away at a first angle "$\theta_1$" for being connected to one the exterior sidewalls 54 of the base 12. Each leg 72 also includes a tab 78 integrally formed with the web 74. The tab 78 extends outwardly away at a second angle "$\theta_2$" for engaging an adjacent one of the legs 72. The first angle "$\theta_1$" is equal to the second angle "$\theta_2$", which permits the rails 76 to be interconnected to collectively define an opening 80 having a shape complementary to a cross-sectional shape defined by the exterior walls 54 of the base 12 for permitting the base 12 to be received within the opening 80.

Each leg 72 also includes a flange 82 integrally formed with the rail 76 and extending transversally away therefrom at a perpendicular angle to the rail 76 for providing enhanced stability to the legs 72.

Obviously, many modifications and variations of the present invention are possible in light of the teachings set forth above. The invention may be practiced other than as specifically described within the scope of the claims. Furthermore, the foregoing description of the preferred embodiment of the invention and the best mode for practicing the invention are provided for the purpose of illustration only and not for the purpose of limitation—the invention being defined by the claims.

What is claimed is:

1. A stand for movably supporting a workpiece thereon, comprising:
    a base having an upper end and a lower end for supporting said stand on a surface;
    a support carried by said upper end of said base; and
    a plurality of roller assemblies mounted on said support member,
    said support including platform having peripheral edges and a central portion and first and second diverging surfaces upon which said roller assemblies are mounted,
    said first and second diverging surfaces each defined by a strap having a major leg extending upwardly from the outer peripheral edge of said platform to a high end of said diverging surface and a minor leg extending upwardly from the central portion of said platform to a low end of said diverging surface,
    each of said roller assemblies defining an infinite surface relative to the workpiece for receiving the workpiece thereon and permitting omnidirectional movement of the workpiece relative thereto.

2. A stand according to claim 1 including a collar mounted on each of said diverging surfaces, each of said roller assemblies including a sphere captured within said collar for permitting free-rolling movement of said sphere relative to said collar and the workpiece.

3. A stand according to claim 1 wherein each of said diverging surfaces includes a slot, an adjustment device adjustably mounting each of said roller assemblies in each of said slots for adjustment of said roller assemblies up and down said diverging surfaces.

4. A stand according to claim 3 wherein said adjustment device includes a threaded shaft extending downwardly from each of said collars and through the associated slot, and a knob threadably engaging each of said threaded shafts for frictionally tightening said collar against said diverging surface.

5. A stand according to claim 3 wherein said support includes an elongate member in telescoping relationship with said base with said platform mounted on said elongate member.

6. A stand according to claim 5 wherein the base is tubular with interior and exterior walls to define a chamber therein, said elongate member of said support telescopically disposed in said chamber of said tubular base, said elongate member having a tapered portion tapering inwardly from an upper portion to a lower portion, a locking pin extending through said tubular base for engaging said tapered portion for preventing downward movement of said elongate member relative to said tubular base.

7. A stand according to claim 6 wherein said base includes a hole extending through said interior and exterior walls, a locking pin disposed in said hole and engaging said tapered portion of the elongate member, thereby releasably locking the lower end against the inner sidewall of the base and placing the support in the selected one of the vertical positions.

8. A stand according to claim 1 wherein each of said diverging surfaces extends at an oblique angle to said platform.

9. A stand according to claim 8 wherein said oblique angle is in the range of 15° to 35°.

10. A stand according to claim 8 wherein said oblique angle comprises 30°.

11. A stand according to claim 1 wherein said base includes a plurality of legs extending radially from said lower end thereof with each leg including a web extending generally parallel to the longitudinal axis of the base and a rail extending outwardly away at a first angle for being connected to one of said exterior sidewalls of said base.

12. A stand according to claim 11 wherein each leg includes a tab integrally formed with said web and extending outwardly away at a second angle for engaging an adjacent one of said legs.

13. A stand according to claim 12 wherein said first angle is equal to said second angle to thereby permit said rails to be interconnected to collectively define an opening having a shape complementary to a cross-sectional shape defined by the exterior walls of said base for permitting said base to be received within said opening.

14. A stand according to claim 13 wherein each leg includes a flange integrally formed with said rail and extending transversally away therefrom at a perpendicular angle to said the rail for providing enhanced stability to the leg assembly.

* * * * *